(12) United States Patent
Kim

(10) Patent No.: US 11,360,578 B2
(45) Date of Patent: Jun. 14, 2022

(54) MOUSE ON CHOPSTICKS STYLE

(71) Applicant: Jong Kil Kim, Guro-Gu Seoul (KR)

(72) Inventor: Jong Kil Kim, Guro-Gu Seoul (KR)

( * ) Notice: Subject to any disclaimer, the term of this patent is extended or adjusted under 35 U.S.C. 154(b) by 0 days.

(21) Appl. No.: 17/262,059

(22) PCT Filed: Apr. 17, 2019

(86) PCT No.: PCT/KR2019/004617
§ 371 (c)(1),
(2) Date: Jan. 21, 2021

(87) PCT Pub. No.: WO2020/036287
PCT Pub. Date: Feb. 20, 2020

(65) Prior Publication Data
US 2021/0311569 A1    Oct. 7, 2021

(30) Foreign Application Priority Data
Aug. 13, 2018  (KR) .................. 10-2018-0094392

(51) Int. Cl.
*G06F 3/0354* (2013.01)
*G06F 3/03* (2006.01)
*G06F 3/038* (2013.01)

(52) U.S. Cl.
CPC ........ *G06F 3/03543* (2013.01); *G06F 3/0304* (2013.01); *G06F 3/0383* (2013.01)

(58) Field of Classification Search
CPC .................... G06F 3/03543; G06F 3/0304
See application file for complete search history.

(56) References Cited

U.S. PATENT DOCUMENTS

| | | | |
|---|---|---|---|
| 2016/0140763 A1* | 5/2016 | Seichter | G06F 3/04812 345/633 |
| 2017/0322643 A1* | 11/2017 | Eguchi | G06F 3/0383 |
| 2018/0224954 A1* | 8/2018 | Chiang | G06F 3/0383 |
| 2019/0113986 A1* | 4/2019 | Bikumala | G06F 3/017 |

FOREIGN PATENT DOCUMENTS

JP    2013-000578    *  5/2013  ............. A63F 13/08

* cited by examiner

*Primary Examiner* — Chun-Nan Lin

(57) ABSTRACT

The present disclosure relates to a mouse on a chopsticks style used as an input device of a computer.

The present disclosure includes: a cylindrical first stick portion having one end portion in which an optical sensor portion is formed; a bridge portion provided obliquely in an upward direction on one surface of the first stick portion; a second stick portion that is formed in the same shape as that of the first stick portion, and has one end separated adjacent to the first stick portion, the other end separated more widely than the one end, and one surface fixed to the bridge portion; and a contact switch portion that includes a case module having one surface fixed to any one stick portion of the first stick portion and the second stick portion, is located between the first stick portion and the second stick portion, and includes a first button portion protruding from the case module toward the other stick portion, the first button portion being pressed when a pressure is applied to the second stick portion.

3 Claims, 4 Drawing Sheets

MOUSE ON CHOPSTICKS STYLE

FIELD OF THE INVENTION

The present disclosure belongs to the technical field of a mouse used as an input device for a computer.

BACKGROUND OF THE INVENTION

Currently, there are many tasks that have to be processed with computers. Due to the increase in the amount of work to be processed by computers, many people naturally use the mouse, the input device of the computer, for a long period of time. Most mice on the market have a shape in which the body is covered with the palm of the hand and buttons are pressed with the index finger and middle finger.

The mouse of this shape has an advantage that it does not slide easily in the user's hand because of its good grip. However, when used for a long period of time, there are problems that fatigue is accumulated in the user's hand and carpal tunnel syndrome is caused in the user's wrist.

In recent years, various mice have been developed to prevent the induction of pain in the user's hand.

For example, at present, a mouse for a computer disclosed in Republic of Korea Utility Model Registration No. 20-0326936 is being developed. However, the developed mouse has a limitation in that the grip and hand posture for gripping the mouse cannot be changed appropriately at that time in computer work.

SUMMARY OF THE INVENTION

The present disclosure is to solve the above-described problems, and the present disclosure focuses on the traditional method of gripping chopsticks in the East as a contrarian approach to the mouse grip, and minimizes the contact surface to the mouse grip to increase the degree of freedom in the shape of the hand so that fatigue in the hand is not caused even if the mouse is used for a long period of time.

In addition, the mouse of the present disclosure enables the user to change the grip posture and hand posture appropriately during use.

The technical problem of the present disclosure is not limited to the above-mentioned problems, and other technical problems that are not mentioned will be clearly understood by those skilled in the art from the following description.

A chopsticks style mouse of the present disclosure for solving the technical problem is a chopsticks style mouse used as an input device of a computer, including: a cylindrical first stick portion having one end portion in which an optical sensor portion is formed; a bridge portion provided obliquely in an upward direction on one surface of the first stick portion; a second stick portion that is formed in a shape similar to that of the first stick portion, and has one end separated adjacent to the first stick portion, the other end separated more widely than the one end, and one surface fixed to the bridge portion; and a contact switch portion that includes a case module having one surface fixed to any one stick portion of the first stick portion and the second stick portion, is located between the first stick portion and the second stick portion, and includes a first button portion protruding from the case module toward the other stick portion, the first button portion being pressed when a pressure is applied to the second stick portion.

The optical sensor portion may include an output module that outputs light, a receiving module that receives light, a housing module that surrounds the output module and the receiving module, and a support module that is obliquely connected to one end of the housing module to support the first stick portion and includes a friction surface protruding from the housing module.

The first stick portion or the second stick portion may include at least one power supply portion, a control unit connected to the power supply portion, and at least one position detection sensor connected to the control unit, and the position detection sensor may output a first position change signal and a second position change signal according to an inclination of the first stick portion or the second stick portion to enable a scroll up and a scroll down.

The first stick portion or the second stick portion may include at least one power supply portion, a control unit connected to the power supply portion, and at least one direction adjusting portion connected to the control unit to adjust a screen output from a monitor connected to the computer.

The direction adjusting portion may be formed on the first stick portion as a scroll wheel parallel to the contact switch portion.

The direction adjusting portion may formed as a protrusion on the first stick portion to adjust a screen output from a monitor connected to the computer by being pulled from the first stick portion.

A direction adjusting portion may be formed as a scroll wheel between one end portions of the first stick portion and the second stick portion.

The direction adjusting portion may be formed as a trackball at one end portion of the second stick portion.

The chopsticks style mouse according to the present disclosure allows the mouse to operate even if the user grips and presses the mouse in various postures, so that the user can freely change the posture of gripping the mouse and the hand posture appropriately during operation of the mouse.

In particular, the mouse of the present disclosure can be operated even if the grip and hand posture are changed appropriately, thereby reducing fatigue of fingers and wrists of the user gripping the mouse.

Furthermore, the mouse of the present disclosure can reduce the fatigue of the hand of the user, so that the user can perform work with high concentration, thereby enhancing the efficiency of work.

DETAIL DESCRIPTION OF PREFERRED EMBODIMENTS

Figure 1:
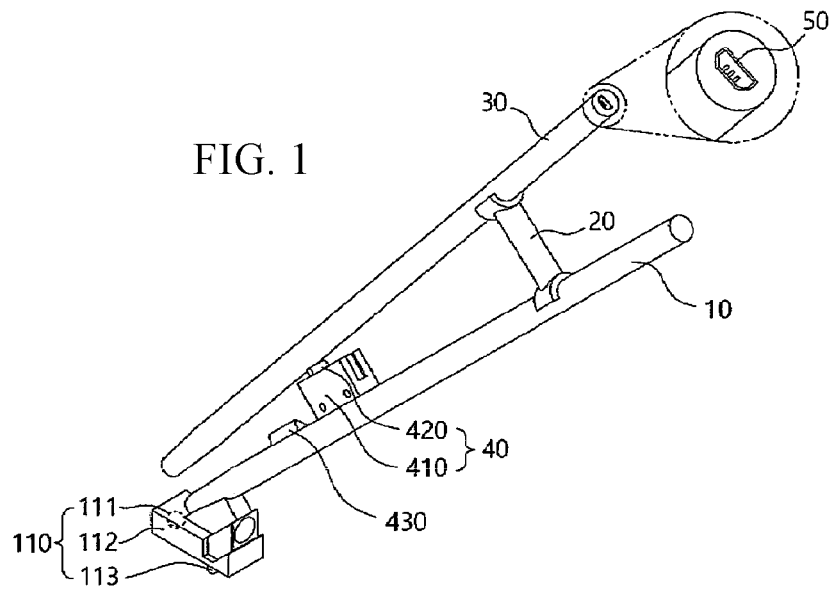
FIG. 1 is a perspective view of a chopsticks style mouse according to an embodiment of the present disclosure.

Hereinafter, embodiments of the present disclosure will be described in detail with reference to the accompanying drawings.

The embodiments of the present disclosure are provided to more completely describe the mouse of the present disclosure to those of ordinary skill in the art, the following embodiments may be modified in various different forms, and the scope of the mouse of the present disclosure is not limited to the following embodiments.

Rather, these embodiments are provided only to completely convey the spirit of the present disclosure to those skilled in the art by making the present disclosure faithful and complete, and are not limited thereto. Like reference numerals in the drawings denote like elements.

In addition, in the drawings in the present specification, some of the constituent elements of the present disclosure are somewhat exaggerated so that the description referring to the drawings can be clearly understood. The shape and size of the constituent elements illustrated in the drawings are not limited to the illustrated shape.

As such, the mouse of the present disclosure can be defined only by the content described in the claims.

Hereinafter, ideal embodiments of the present disclosure will be described with reference to the illustrated drawings.

First, a chopsticks style mouse according to an embodiment of the present disclosure will be outlined with reference to FIG. 1.

FIG. 1 is a perspective view of the chopsticks style mouse according to the embodiment of the present disclosure.

A chopsticks style mouse 1 is an input device of a computer in a chopsticks shape.

The chopsticks style mouse 1 of the present disclosure includes, in the shape of chopsticks, a first stick portion 10 having one end portion placed on the middle finger of a user and the other end portion placed in the valley between the thumb and the index finger of the user, a second stick portion 30 having one end portion that is pressed at one end by the index finger of the user, a contact switch portion 40 positioned between the first stick portion 10 and the second stick portion 30, and the like.

The user may grip the first stick portion 10 and the second stick portion 30 in a hand posture gripping chopsticks or in a hand posture gripping a pencil. The user may grip the first stick portion 10 and the second stick portion 30 in a hand posture gripping chopsticks and a pencil so that light is output from an optical sensor portion 110 provided at one end portion of the first stick portion for use as a mouse.

The user can feel a high grip while gripping the chopsticks style mouse 1 with only the thumb, index finger, and middle finger, that is, three fingers.

The chopsticks style mouse allows the user to fold the ring finger and the little finger into the palm of the hand while gripping the mouse of the present disclosure, thereby reducing fatigue accumulated on the palm.

In addition, while the chopsticks style mouse 1 is gripped by the user, the side of the palm of the user, that is, the edge of the hand is in contact with the bottom, whereby the load concentrated on the wrist is reduced and pain due to carpal tunnel syndrome does not occur.

In addition, in the chopsticks style mouse 1, the first stick portion 10 and the second stick portion 30 are formed in a long stick shape so that a first button portion 420 of the contact switch portion 40 can be pressed even if the user presses any section of the second stick portion 30 below the part in contact with a bridge portion 20. In addition, the first stick portion 10 is placed in the valley between the thumb and the index finger of the user so that the user can press the second stick portion 30 with a small force.

The chopsticks style mouse 1 can be operated with one hand independently from the bottom surface, unlike a conventional mouse, that is, a mouse which is clicked by applying a force to the bottom and which cannot be clicked without the bottom.

Accordingly, the user can use the mouse of the present disclosure in a manner similar to a conventional mouse by pressing the second stick portion 30 with a small force even if the user grips the first stick portion 10 and the second stick portion 30 short or long The chopsticks style mouse 1 of the present disclosure includes the first stick portion 10, the bridge portion 20, the second stick portion 30, the contact switch portion 40, and the optical sensor portion 110 as constituent elements. Furthermore, the mouse of the present disclosure may include a power supply portion 50, a control unit (not shown), a position detection sensor 60, a direction adjusting portion 70, and the like as constituent elements.

Hereinafter, the constituent elements of mouse of the present disclosure and features of each constituent element will be described in detail with reference to FIGS. 2 to 5.

Figure 2:
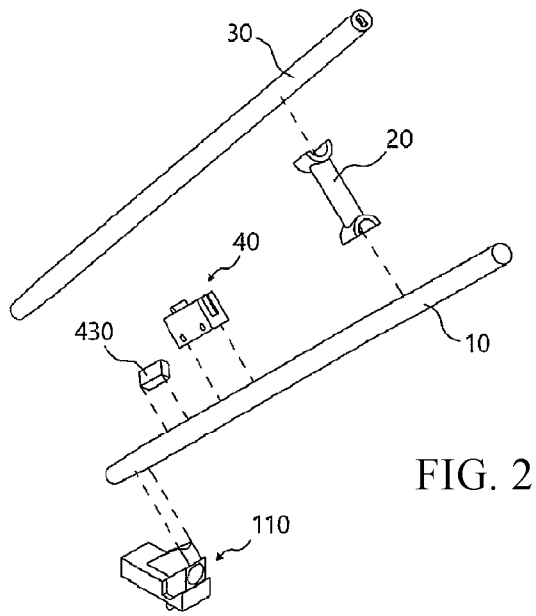
FIG. 2 is an exploded perspective view of FIG. 1.
Figure 3:
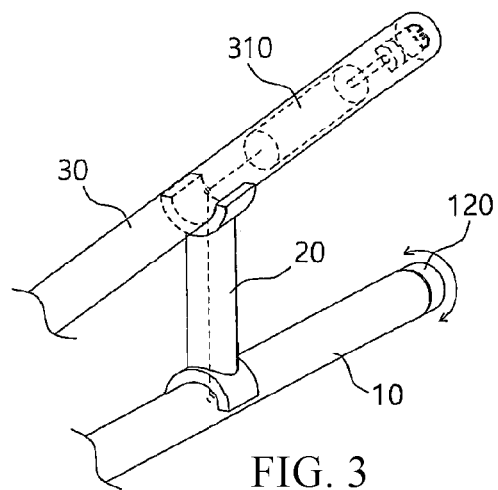
FIG. 3 is an enlarged view of a bridge portion of FIG. 1.
Figure 4:
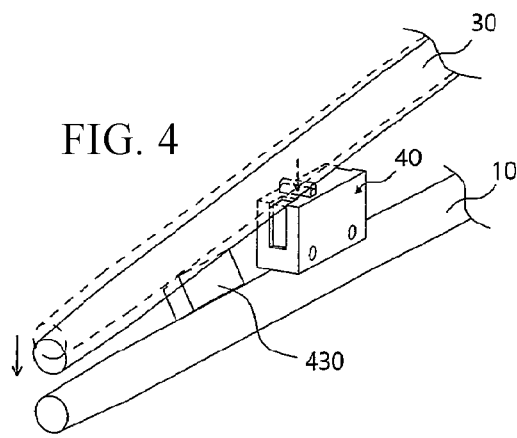
FIG. 4 is an enlarged view of a contact switch portion of FIG. 1.
Figures 5A, 5B:
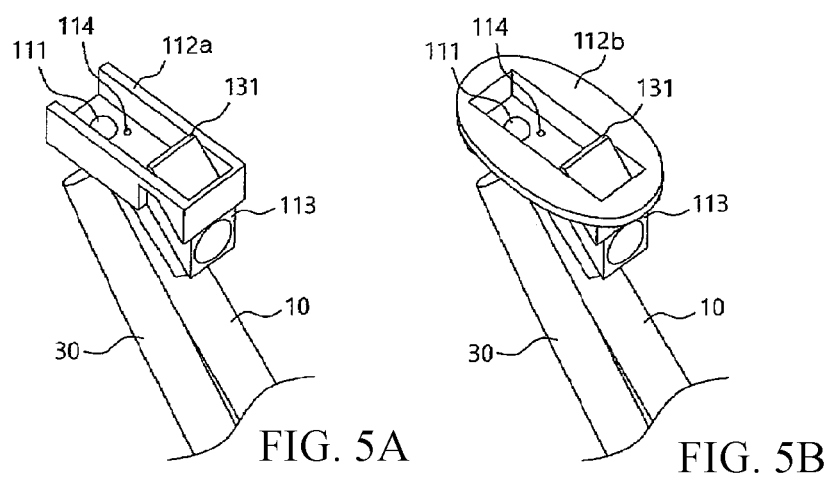
FIGS. 5A and 5B are enlarged views of an optical sensor portion of FIG. 1.

FIG. 2 is an exploded perspective view of FIG. 1, FIG. 3 is an enlarged view of the bridge portion of FIG. 1, and FIG. 4 is an enlarged view of the contact switch portion of FIG. 1. FIGS. 5A and 5B are enlarged views of the optical sensor portion of FIG. 1.

The first stick portion 10 and the second stick portion 30 are the body portions of the chopsticks style mouse 1. Both the first stick portion 10 and the second stick portion 30 may be formed in a cylindrical shape. In addition, the first stick portion 10 and the second stick portion 30 may be formed in the shape of a cylindrical cone whose diameter gradually increases from one end portion to the other end portion.

Any one of the first stick portion 10 or the second stick portion 30 may be provided with the power supply portion 50 that generates an electric force, the control unit (not shown) connected to the power supply portion 50, the position detection sensor 60 connected to the control unit (not shown), the direction adjusting portion 70 connected to the control unit (not shown), and the contact switch portion 40. In addition, a DPI adjusting portion 120 may be provided. Here, the DPI adjusting portion 120 moves left and right to adjust the DPI of the mouse.

In the present specification, for concise and clear description, the contact switch portion 40, the position detection sensor 60, and the DPI adjusting portion 120 are provided in the first stick portion 10, and the power supply portion 50 is provided in the second stick portion 30 as an example.

The first stick portion 10 is formed in a stick shape having a predetermined length and diameter. The optical sensor portion 110 is provided in one end portion of the first stick portion 10.

The second stick portion 30 is formed in a similar shape to the first stick portion 10. That is, the second stick portion 30 is formed in a stick shape having a predetermined length and diameter. The other end portion of the second stick portion 30 is provided with the power supply portion 50, that is, a battery portion 310 connected to a power pin port.

The second stick portion 30 may output light from the optical sensor portion 110 through power applied from the power supply portion 50. Here, a detailed description of the optical sensor portion 110 will be provided later.

When the first stick portion 10 in which the optical sensor portion 110 is provided is gripped by the user, one end portion may be located on the middle finger of the user, and the other end portion may be located in the valley between the thumb and the index finger of the user. The bridge portion 20 is provided on one surface of the first stick portion 10.

The bridge portion 20 has one end portion connected to the first stick portion 10 and the other end portion connected to the second stick portion 30, so that the distance between the first stick portion 10 and the second stick portion 30 can be maintained. At the upper end portion and the lower end portion of the bridge portion 20, grooves corresponding to the shapes of the first stick portion 10 and the second stick portion 30 may be respectively formed to increase connectivity to the first stick portion 10 and the second stick portion 30. As an example, as shown in FIG. 3, a groove having an inverted "∩"-shaped longitudinal section may be formed at the lower end portion of the bridge portion 20, and a groove having a "∪"-shaped a longitudinal section may be formed at the upper end portion.

The bridge portion 20 may be provided obliquely upward on one surface of the first stick portion 10 to support the second stick portion 30. At this time, in the bridge portion 20, one end of the second stick portion 30 may be adjacent to the first stick portion 10, and the other end of the second stick portion 30 may be separated more widely from the first stick portion 10 than one end of the second stick portion 30.

In addition, the bridge portion 20 may be formed of an elastic body to contract when a force is applied to the second stick portion 30 and restore to its original state when the applied force is removed. Accordingly, when the user presses and releases the second stick portion 30 with a finger, the second stick portion 30 can return to its original position.

The contact switch portion 40 is provided between the first stick portion 10 and the second stick portion 30, and when the user presses the second stick portion 30 with a finger, the pressure is transmitted to the contact switch portion 40 to generate an operation signal.

The contact switch portion 40 includes a case module 410 fixed to one stick portion of the first stick portion 10 and the second stick portion 30 and the first button portion 420 protruding outward from the case module 410. As an example, as shown in FIG. 4, the contact switch portion 40 may be formed in a structure in which the case module 410 is fixed on the first stick portion 10 and the first button portion 420 protrude from the upper surface of the case module 410 toward the second stick portion 30.

The contact switch portion 40 may be set so that the first button portion 420 is pressed when a pressure is applied to the second stick portion 30, and the first button portion 420 is not pressed when the pressure applied to the second stick portion 30 is removed. In addition, a second button portion 430 having a structure protruding toward the right from one side is formed at the lower end portion of the first stick portion 10. The user may extend the middle finger to use the second button portion 430.

At this time, considering that a right-handed user uses the middle finger when using the right button of a conventional mouse, the second button portion 430 is formed at the above-mentioned position of the first stick portion 10 so that the right-handed user can use the second button portion 430 using the middle finger even in the chopsticks style mouse of the present disclosure. Here, the first button portion 420 may be the left button of an ordinary mouse used by a right-handed person, and the second button portion 430 may be the right button.

The optical sensor portion 110 contacts a mouse pad and outputs light to the mouse pad, receives the reflected light, and generates a cursor on a computer screen.

The optical sensor portion 110 includes an output module 111, a receiving module 114, a housing module 112a or 112b, and a support module 113. Here, the output module 111 is connected to the power supply portion 50 through the control unit (not shown) and outputs light from electric energy output from the power supply portion 50. The receiving module 114 receives the light reflected by the mouse pad. The housing module 112a or 112b surrounds the output module 111 and the receiving module 114, and allows the light output from the output module 111 to be completely received by the receiving module 114 without being scattered to the outside.

The housing module 112a or 112b may be formed to meet both purposes of easy movement of the mouse with an open lower surface and level maintenance for accuracy of optical sensor sensing. As an example, as shown in FIG. 5A, the housing module 112a or 112b may be formed in the shape of a rectangular parallelepiped 112a or an ellipse 112b having an area of about 2 cm×0.7 cm to 3 cm×2 cm.

The support module 113 may be provided on one side surface of the housing module 112a or 112b or inserted into a part thereof to support a part of the first stick portion 10. As an example, the support module 113 may be obliquely connected to the housing module 112a or 112b at an acute angle to support the first stick portion 10.

The support module 113 may include a friction surface 131 to protrude from the housing module 112a or 112b. The friction surface 131 has an area capable of achieving both level maintenance and a small coefficient of friction at the same time when the optical sensor portion 110 contacts the mouse pad.

Hereinafter, a state in which the user grips and uses the chopsticks style mouse of the present disclosure in different hand postures will be described with reference to FIGS. 6A and 6B.

Figures 6A, 6B:
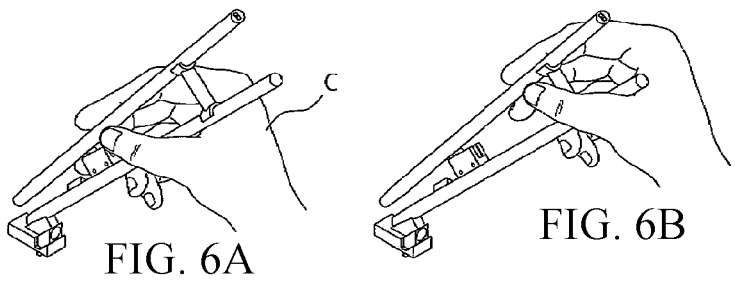
FIGS. 6A and 6B are diagrams showing a user gripping the chopsticks style mouse in FIG. 1 in different hand postures.

FIGS. 6A and 6B are diagrams showing a user gripping the chopsticks style mouse 1 in FIG. 1 in different hand postures.

In the chopsticks style mouse 1, the first stick portion 10 and the second stick portion 30 are longer than the length of a conventional mouse, and since the contact switch portion 40 is formed between the first stick portion 10 and the second stick portion 30, the first button portion 420 of the contact switch portion 40 may be pressed even if a part of the first stick portion 10 or the second stick portion 30 is pressed.

A user C may grip and use the chopsticks style mouse 1 short or long according to the working situation. As an example, in the case of the battlefield of a game or a fast task, the user C may grip the first stick portion 10 and the second stick portion 30 short and move them quickly as shown in FIG. 6A. On the other hand, in the case of tasks such as simple document search or Internet surfing, the user C may grip the first stick portion 10 and the second stick portion 30 long and move them slowly as shown in FIG. 6B.

That is, the user C may grip and operate the chopsticks style mouse 1 by changing the hand posture appropriately at that time during games, Internet surfing, office work, and design work. Moreover, the user can use only the minimum force in using the mouse by pressing the second stick portion 30 with a small force after placing the first stick portion 10 in the valley between the thumb and the index finger.

As described above, the chopsticks style mouse 1 of the present disclosure can be used by the user with a minimum force, thereby reducing fatigue of the hand of the user and preventing the occurrence of carpal tunnel syndrome.

Hereinafter, a change in the intensity of light output from the optical sensor portion will be described with reference to FIGS. 7 and 8A-8B.

Figure 7:
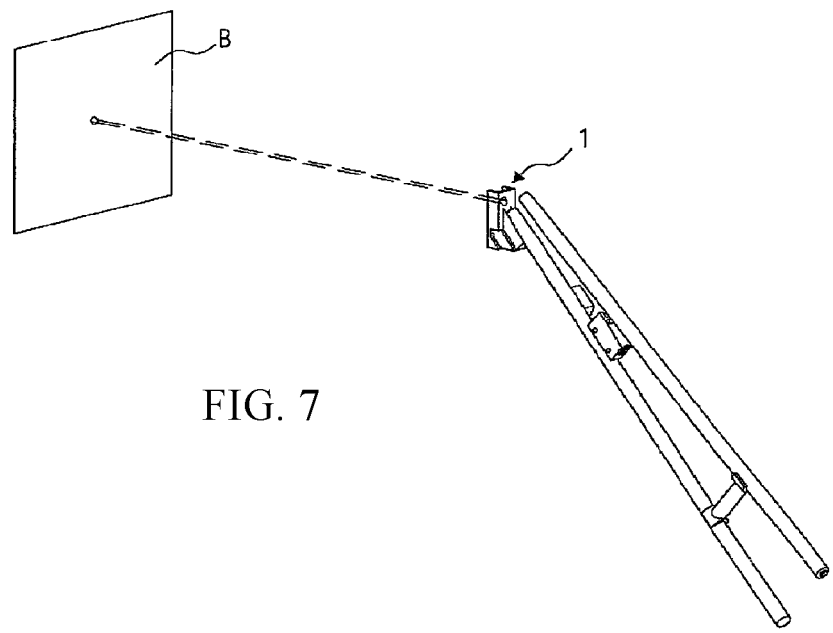
FIG. 7 is a diagram showing a state in which the optical sensor portion is of an appropriate size and is freely used for a notebook or an opposite palm because a bottom surface is not required when clicking.
Figures 8A, 8B:
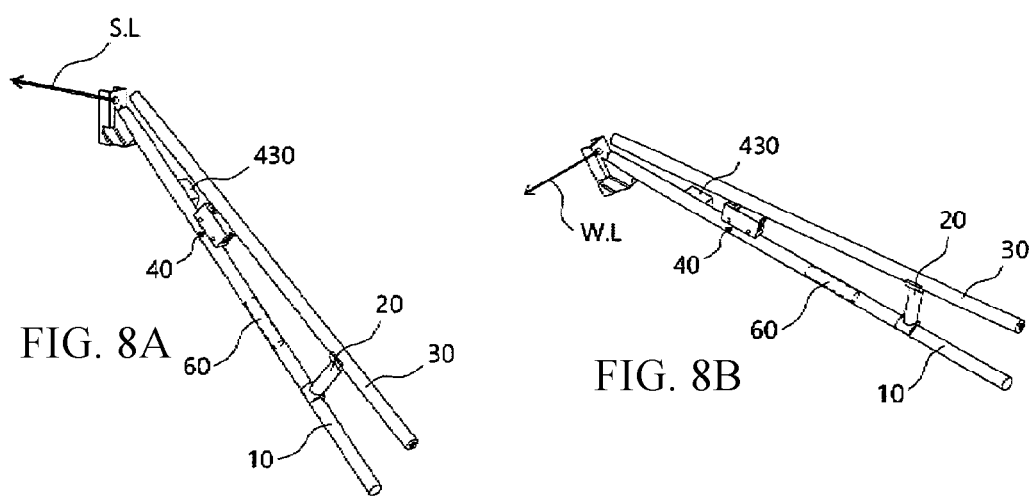
FIGS. 8A and 8B are diagrams showing operation of the position detection sensor of FIG. 1 and adjustments to the intensity of light output from the optical sensor portion.

FIG. 7 is a diagram showing a state in which the optical sensor portion of FIG. 1 irradiates a notebook instead of the mouse pad with light, and is used as a mouse, and FIGS. 8A and 8B are diagrams showing operation of the position detection sensor of FIG. 1 and adjustments to the intensity of light output from the optical sensor portion.

As shown in FIG. 7, the optical sensor portion 110 can be operated as a conventional mouse through an object B that is far away from the optical sensor portion 110, not in a direction in contact with the mouse pad.

The chopsticks style mouse 1 may output light by changing the intensity of the light in the output module 111 through the position detection sensor 60 and the control unit (not shown) provided therein.

More specifically, in the chopsticks style mouse 1, when one end portion of the first stick portion 10 is not on the bottom but is lifted to the object B in the front, the position detection sensor 60 detects a position change in the first stick portion 10 and generates a position change signal.

In this case, the position detection sensor may generate a first position change signal and a second position change signal different from the first position change signal in response to the position change.

The chopsticks style mouse 1 may generate different position change signals when the first stick portion 10 is lifted high from the bottom as shown in FIG. 8A, and when the first stick portion 10 is lifted slightly from the bottom as shown in FIG. 8B.

As an example, the chopsticks style mouse 1 may operate to scroll up by the first position change signal output from the position detection sensor when the entire chopsticks style mouse 1 is made to stand at 75° or more, and may operate to scroll down by the second position change signal output from the position detection sensor when the entire chopsticks style mouse 1 is inclined at 40° or less. That is, the chopsticks style mouse 1 may perform a scroll up/down function using the position detection sensor.

The control unit (not shown) receives the position change signal generated by the position detection sensor 60, generates an output signal corresponding thereto, and applies the output signal to the output module 111. The output module 111 receives the signal from the control unit and outputs light of various intensities according to the received signal.

That is, the output module 111 outputs light of various intensities corresponding to the degree to which the first stick portion 10 is lifted from the bottom. Therefore, the output module 111 may output strong light (S.L) in the situation of FIG. 8A, and in the situation of FIG. 8B, output weak light (W.L), which is weaker than the light output in the situation of FIG. 8A.

The chopsticks style mouse 1 becomes a mouse for a three-dimensional space, and becomes a mouse advanced from the conventional mouse.

Hereinafter, the direction adjusting portion that may be formed on at least one of the first stick portion and the second stick portion will be described with reference to FIGS. 9A, 9B, 9C, 10A and 10B.

FIGS. 9A-10B are views showing various modification examples of the direction adjusting portion provided in FIG. 1.

The direction adjusting portion 70 may be connected to the control unit (not shown) and generate a signal different from the first button portion 420 and the second button portion. As an example, the direction adjusting portion 70 may generate a signal that is similar to the output when a scroll wheel formed in a conventional mouse is operated. That is, the direction adjusting portion 70 has the same function as the scroll wheel provided in a conventional mouse.

Figure 9A:
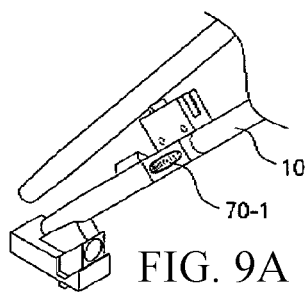
FIGS. 9A, 9B, 9C, 10A and 10B are diagrams showing various modification examples of a direction adjusting portion provided in FIG. 1.
Figure 9B:
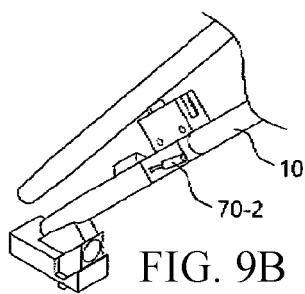

The direction adjusting portion 70 may be formed on the first stick portion 10 as a scroll wheel 70-1 parallel to the contact switch portion 40 as shown in FIG. 9A. Alternatively, as shown in FIG. 9B, a protrusion 70-2 in the shape of a toggle switch may be formed on the first stick portion 10. At this time, the protrusion 70-2 is formed in a structure that is pulled from the first stick portion 10 or pressed by the first stick portion 10, and performs the same function as an existing scroll wheel by being pulled or pressed by the user.

Figure 9C:
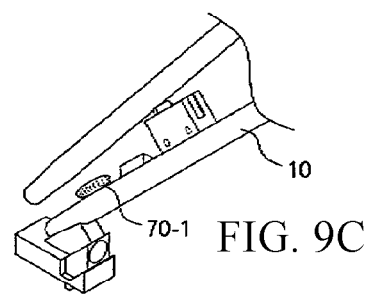

In addition, the direction adjusting portion 70 may be provided between one end portions of the first stick portion 10 and the second stick portion 30 as shown in FIG. 9C.

While using the chopsticks style mouse 1 to move the pointer by bringing the optical sensor portion 110 into contact with the mouse pad, the user may use the direction adjusting portion 70 like the scroll wheel provided in a conventional mouse by rotating and pushing the direction adjusting portion 70 in one direction to be brought into contact with the mouse pad or pushing the direction adjusting portion 70 with the hand.

Figure 10A:
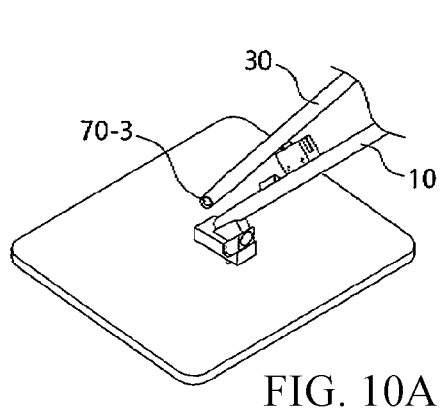

In addition, the direction adjusting portion 70 may be formed as a trackball 70-3 provided at the end of one end portion of the second stick portion 30 as shown in FIG. 10A.

While performing an operation to move the position of the cursor by bringing the optical sensor portion 110 into contact with the mouse pad, the user may rotate the first stick portion 10 and the second stick portion 30 by 180° in a roll direction to bring the trackball 70-3 into contact with the mouse pad such that the trackball can be used as a button to move the screen output from the monitor connected to a computer upward or downward.

Figure 10B:
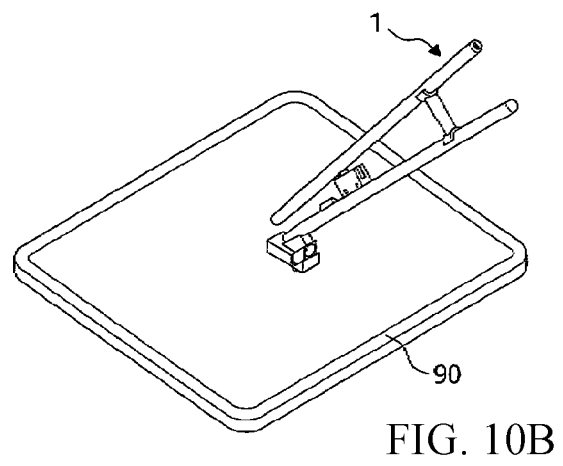

The chopsticks style mouse 1 of the present disclosure may operate in conjunction with a four-way button pad 90 as shown in FIG. 10B. At this time, the four-way button pad 90 may be a four-way button pad exclusively for scrolling.

The user may use the chopsticks style mouse 1 as a cursor to move on the monitor and the four-way button pad 90 as a button to move the screen output from the monitor connected to the computer upward or downward.

Here, the user may use the chopsticks style mouse 1 with the right hand, and press the four-way button pad with a finger that is not used to grip the chopsticks style mouse 1, that is, the ring finger.

While embodiments of the present disclosure have been described above with reference to the accompanying drawings, those of ordinary skill in the art to which the present disclosure pertains can understand that the present disclosure can be implemented in other specific forms without changing the technical spirit or essential features thereof. Therefore, it should be understood that the embodiments described above are illustrative in all respects and not limiting.

| Detailed Description of Main Elements | |
|---|---|
| 1: chopsticks style mouse | 10: First stick portion |
| 110: Optical sensor portion | 111: Output module |
| 112a, 112b: Housing module | 113: Support module |
| 131: Friction surface | 114: Receiving module |
| 120: DPI adjusting portion | 20: Bridge portion |
| 30: Second stick portion | 310: Battery portion |
| 40: Contact switch portion | 410: Case module |
| 420: First button portion | 50: Power supply portion |
| 60: Position detection sensor | 70: Direction adjusting portion |
| 70-1: Protrusion | 70-2: Scroll wheel |
| 70-3: Trackball | 80: Stick connection portion |
| 90: Four-way button pad | A: Band |
| B: Object | C: User |

The invention claimed is:

1. A chopsticks style mouse used as an input device of a computer, comprising:
 a first stick portion having a first end portion in which an optical sensor portion is formed;
 a bridge portion, formed of an elastic body, provided obliquely in an upward direction on a first surface of the first stick portion;
 a second stick portion, having a shape similar to that of the first stick portion, and having a first end, separated from and adjacent to the first end of the first stick portion, a second end, separated more widely from the first stick portion than the first end of the second stick portion, and a first surface fixed to the bridge portion; and
 a contact switch portion that includes:
  a case module, having a surface fixed to the first stick portion and being positioned between the first stick portion and the second stick portion, and
  a first button portion protruding from the case module toward the second stick portion,
 the first button portion being pressed by the second stick portion when a pressure is applied to the second stick portion toward the first stick portion, the first button portion being returned to a non-press state by dint of an elastic force of the bridge portion between the first stick portion and the second stick portion when a pressure to the second stick portion is removed.

2. The chopsticks style mouse according to claim 1, wherein the optical sensor portion includes an output module that outputs light, a receiving module that receives light, a housing module that surrounds the output module and the receiving module, and a support module that is obliquely connected to one end of the housing module to support the first stick portion and includes a friction surface protruding from the housing module.

3. The chopsticks style mouse according to claim 1,
 wherein the first stick portion or the second stick portion includes at least one power supply portion, a control unit connected to the power supply portion, and at least one position detection sensor connected to the control unit, and
 the position detection sensor outputs a first position change signal and a second position change signal according to an inclination of the first stick portion or the second stick portion to enable a scroll up and a scroll down.

* * * * *